United States Patent [19]

Wolters et al.

[11] Patent Number: 4,777,013

[45] Date of Patent: Oct. 11, 1988

[54] NUCLEAR REACTOR, IN PARTICULAR A HIGH-TEMPERATURE REACTOR

[75] Inventors: Johannes P. Wolters, Düren; Manfred Nickel, Aachen, both of Fed. Rep. of Germany

[73] Assignee: Kernforschungsanlage Juelich GmbH, Juelich, Fed. Rep. of Germany

[21] Appl. No.: 889,123

[22] Filed: Jul. 24, 1986

[30] Foreign Application Priority Data

Jul. 24, 1985 [DE] Fed. Rep. of Germany ....... 3526377

[51] Int. Cl.$^4$ .............................................. G21C 9/00
[52] U.S. Cl. .................................... 376/283; 137/340; 267/182; 376/293; 376/298; 376/463
[58] Field of Search ................... 137/340; 267/182; 376/277, 282, 293, 294, 295, 296, 298, 299, 381, 406, 463

[56] References Cited

U.S. PATENT DOCUMENTS

| | | | |
|---|---|---|---|
| 3,056,736 | 10/1962 | Went et al. | 376/293 |
| 3,228,414 | 1/1966 | Zerigian | 137/340 |
| 4,645,641 | 2/1987 | Nicolai et al. | 376/283 |

FOREIGN PATENT DOCUMENTS

| | | | |
|---|---|---|---|
| 2361102 | 6/1974 | Fed. Rep. of Germany | . |
| 2430724 | 1/1976 | Fed. Rep. of Germany | . |
| 3121377 | 12/1982 | Fed. Rep. of Germany | 376/296 |

OTHER PUBLICATIONS

W. Wachholz, Das Sicherheitskonzept des HTR-500, 6/85, pp. 47–54.

*Primary Examiner*—David H. Brown
*Assistant Examiner*—Richard W. Wendtland
*Attorney, Agent, or Firm*—Shlesinger, Arkwright & Garvey

[57] ABSTRACT

A high-temperature gas cooled nuclear reactor system comprises a containment building, a concrete reactor pressure vessel inside the containment building, and a safety relief valve connected to the concrete reactor pressure vessel. The spring of the safety valve consists of a material with a spring constant decreasing as temperature rises. A heat exchanger is provided in close proximity to cool the spring of the safety valve which is subject to the heat of the reactor coolant escaping when the safety valve is open. The heat exchanger of the safety valve is connected to a liner cooling system of the concrete reactor pressure vessel.

13 Claims, 2 Drawing Sheets

NUCLEAR REACTOR, IN PARTICULAR A HIGH-TEMPERATURE REACTOR

The invention concerns a nuclear reactor, in particular a high-temperature reactor, with a reactor protecting building and therein a reactor-pressure container, in particular, one made of concrete and equipped with at least one safety valve in the form of a spring-valve to limit—in the event of reactor overheating—the pressure in the reactor-pressure container which comprises an inside liner associated with cooling ducts connected to at least one liner cooling equipment.

In high-temperature reactors of the above kind, the entire primary closed circuit is integrated into the pressure container. The pressure container consists of prestressed concrete. To achieve adequate gas hermeticity against the pressurized helium acting as the primary coolant, the reactor pressure container is equipped on the inside with a steel lining, the so-called liner. On the gas side, the liner is provided with thermal insulation and on the concrete side with cooling ducts connected to one or more water cooling systems. In this manner the liner and the concrete are protected against the high gas temperatures.

Nuclear reactor overheating takes place when the gas cooling fails. Those malfunctions are prevalent which occur for pressurized primary circulation. A special role falls also to those malfunctions related to additional failure of the liner cooling, and which may have the worst consequences imaginable. This is due to the fact that in the later stages of the malfunction, when already substantial quantities of radiological fission products have been released from the fuel elements, there will be liner destruction and thermal dissociation of the concrete on the inside of the reactor pressure container.

Ordinarily, the reactor pressure container is protected against excessive pressure by one or more safety valves staggered with respect to triggering pressure. Preceding or following check valves offer an additional way of blocking in the case a safety valve in the open position should fail. As regards nuclear reactor overheating taking place under pressure, the thermal expansion of the primary gas causes the safety valves to respond when the pressure increase is not compensated for by helium withdrawal through the gas purification plant.

It is desired that the safety valves act in different ways. If the liner cooling is operative, their operation should be regular, that is, the safety valve(s) should open when the response pressure has been exceeded and close again when there is a subsequent decrease below the operational pressure. In the event of a failure of the liner cooling, the safety valve(s) should remain open as, in such an event, total pressure relief of the primary circulation is desired.

These goals can be achieved by safety valves which permit opening against spring force by means of their own drives. This design however incurs the drawback that control errors may result in accidental opening of the primary closed circuit. Furthermore, auxiliary power often is required to open them.

Moreover complete pressure relief of the primary circulation in the event of failed liner cooling is not necessarily desirable. Thus, if the reactor were totally pressure-relieved, the fuel elements would be raised to higher temperatures whereby more fission products would be released by the fuel elements. Further, significant amounts of fission products are released by the fuel elements already during the pressure relief phase and are immediately carried by the outflowing helium into the reactor protecting building. Again, it might happen that pressure should build up behind the liner in the concrete because of the evaporation of the water in the concrete, whereby the liner might fail prematurely if a matching opposing pressure were absent on the inside. Lastly, the evacuation of the gas from the primary circuit is provided in only the open relief line. This line is incapable of retaining significant quantities of fission products.

Accordingly, it is the object of the invention to so design the pressure relief in a nuclear reactor of the initially stated type that it is better matched to the particular situation in a nuclear reactor overheating case and that it operates more reliably.

This problem is solved by the invention in that the valve-spring(s) of the safety valve(s) consist(s) of a material of which the spring-constant decreases with temperature and that they are exposed to the gas flowing out of the particular safety valve, and that provision is made for at least one cooling apparatus to cool the valve spring(s) and/or the gas before the outflow, where this cooling apparatus is connected to at least one liner cooling equipment.

In the invention, depending on the kind and time sequence of the malfunction, the valve spring of a safety valve is variably thermally stressed by the gas flowing out of the now open safety valve, the particular valve spring having a decreasing spring constant as the temperature rises. The thermal loading of the particular valve spring is controlled by a cooling system connected to the liner cooling equipment. If the liner cooling equipment operates normally, then the cooling apparatus it feeds ensures that the particular valve spring remains relatively cold, and its closing force therefore corresponds to the operational pressure or is somewhat higher. This takes place alternatively or in combination in that the particular valve spring and/or the gas of the primary system are cooled before passing through the particular safety valve. Accordingly, if there is nuclear reactor overheating and thereby an opening of the particular safety valve while the liner cooling equipment keeps operating normally, then there follows merely a pressure drop down to the operational pressure because the particular valve spring is designed for this pressure and its spring constant is kept fixed by the cooling equipment.

If the liner cooling equipment were to fail, then the particular valve spring and the housing surrounding it is exposed to the hot, discharging gas and is raised to a temperature at which its spring constant drops considerably. In this manner, the closing force of the particular safety valve is automatically lowered, and as a result a corresponding pressure relief of the reactor pressure container is achieved. However, the pressure relief is not total. Therefore the primary circuit remains at a lower pressure, whereby the fission products released by the fuel elements remain enclosed for many days in the primary circuit. They can escape from the primary circuit only after the thermal destruction of the liner. By that time many have disappeared entirely by radioactive decay or have deposited themselves on the colder sites of the primary circuit, whereby they are no longer available for release from the primary circuit or only conditionally. Furthermore, the time when the liner is destroyed thermally can be extended considerably by the pressurization in the primary circuit because the inside pressure counteracts any liner failure by collapse.

The pressure in the primary circuit also prevents massive water and steam penetration from the liner cooling equipment and from the heated concrete after liner destruction.

Moreover, the gas escaping through the concrete after the liner has been destroyed no longer arrives unfiltered into the reactor protecting building. A large part of the entrained fission products is retained in the narrow and wide flowpaths in the concrete. A significant contribution to this result comes from the condensation of steam caused by the strong cooling of the gas inside the concrete. The body of concrete therefore serves as a sink for both fission products and heat.

In an embodiment of the invention, the cooling apparatus are connected to all the liner cooling equipment so that heating of the valve spring due to the discharging gas takes place only when all cooling apparatus have failed. Preferably the cooling apparatus are connected to the intake of the particular cooling equipment to achieve adequate cooling.

The safety valve(s) appropriately are designed in such a manner that any excess pressure in the reactor pressure container would lead to closing the safety valve(s) no earlier than after one hour. Also, the material of the valve spring(s) shall evince a spring constant which drops sharply above 150° C., for instance the spring material 50CrV4.

A further embodiment of the invention provides that the valve spring(s) of the safety valve(s) is designed in such a manner that their closing pressure in the event of malfunction of the liner cooling equipment and for open safety valve(s) is in the range of the pressure level of the liner cooling equipment.

In a further development of the invention, the safety valve(s) are such that their valve spring(s) are exposed to the heat from the gas discharging from the pressure container only after the safety valve(s) have opened. As a result, the particular safety valve will not yet respond when there is a single failure of the liner cooling equipment, rather it will only respond when there shall be a pressure in the reactor pressure vessel which exceeds the triggering pressure. Accordingly, there cannot be an accidental opening of the particular safety valve in the event of liner cooling equipment failure.

In a further feature of the invention, the safety valve(s) are enclosed by a thermally insulating housing. Such a heat insulating housing reduces heat losses when the valve spring is heated, and thereby assures a rapid drop of the closing force.

The invention further provides that each safety valve housing is enclosed in the region of the valve spring(s) by welded-on cooling coils of the cooling apparatus.

To solve the problem stated above, the invention further provides that each liner cooling equipment includes in its discharge at least one safety valve so that primary system gas can be evacuated through the liner cooling equipment when the liner is destroyed. It is possible then to reduce any excess pressure setting in on account of the evaporation of concrete water through the safety valve(s). In the process, the gas flows through a plurality of thin tubes which may extend several meters through the concrete. The gas then cools within these tubes and loses part of the entrained fission products capable of deposition. Thereby thermal relief is provided also to the subsequent system of pipes.

By using the liner cooling equipment to ensure the already damaged reactor pressure container against excess pressure, it is possible to eliminate those safety valves of which the response pressure, in the event of a nuclear reactor overheating malfunction together with failure of the liner cooling equipment, is reduced. In the liner cooling equipment, the safety valves anyway already are set for the required low pressure. Because it does not communicate in normal operation with the primary circuit, the accidental opening of a safety valve cannot lead to unchecked activity into the reactor protecting building.

The above concept of the solution can be implemented in especially advantageous manner because the two malfunctions, namely the pressure rise in the reactor pressure container above the operational pressure and the failure of the liner cooling equipment within the scope of a nuclear reacting overheating case, can take place sequentially, so that the problem under consideration herein is solved especially advantageously by combining both concepts of the invention.

Appropriately the safety valve(s) have a closing force somewhat above the operational pressure of the particular liner cooling equipment.

It is especially advantageous to provide each safety valve with a venting conduit terminating in a water seal. As the liner cooling equipment almost always is a water system, the connection to such a water seal presents no problems. The volatile and solid fission products contained in the discharging gas are retained in the water seal.

Lastly, the invention provides that each safety valve is bridged by a remote-controlled bypass valve allowing complete pressure relief of the primary circuit through the liner cooling equipment.

The invention is shown in closer detail by means of an illustrative embodiment in the drawing.

Figure 1:
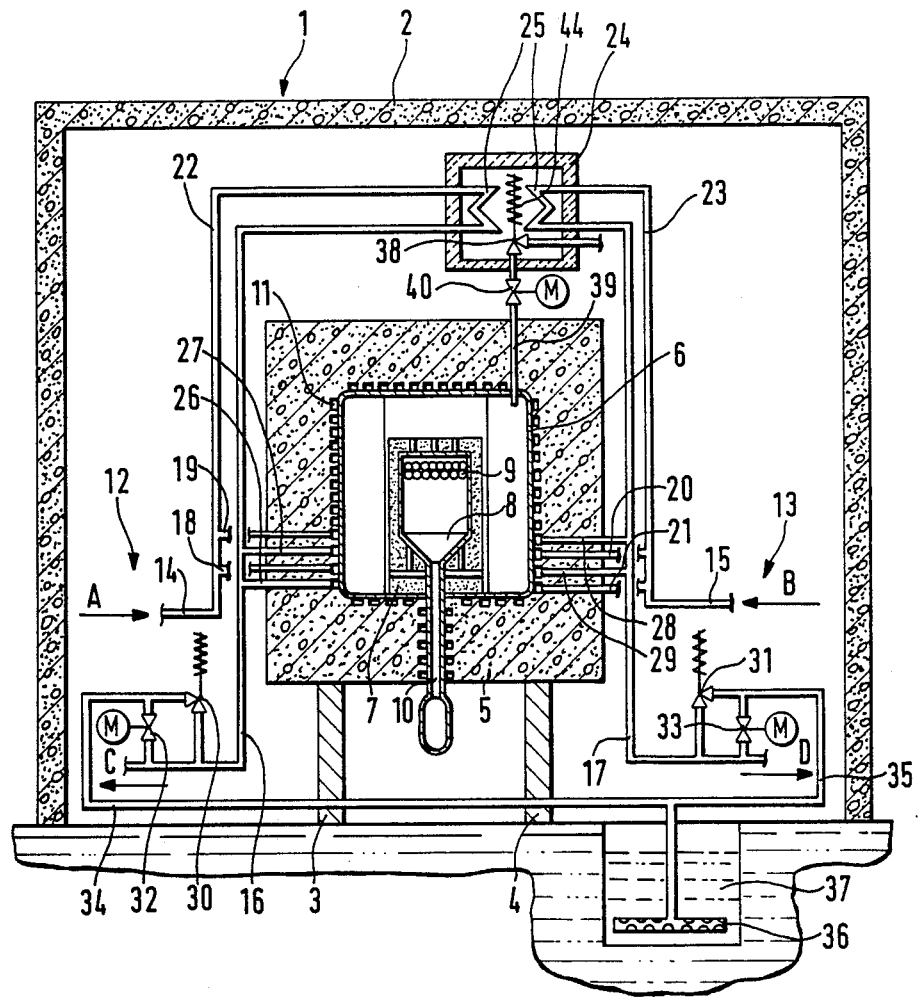
FIG. 1 is a vertical section of a high-temperature reactor.

The high-temperature reactor 1 is enclosed by a reactor protecting building 2. Within the reactor protecting building 2, a reactor pressure container 5 made of prestressed concrete is mounted on columns 3, 4. The inside of the reactor pressure container 5 is fully lined in pressure-resistant manner with a steel plate liner 6.

The reactor pressure container 5 contains a graphite reflector 7 enclosing the reactor core 8 which consists of a heap of spherical fuel elements 9. At the bottom, the reactor core 8 joins a removal pipe 10 through which the fuel elements 9 can be withdrawn downwardly from the reactor core 8. The reactor core 8 is crossed by the coolant helium passing through conduits shown only diagrammatically herein, the helium in the process rising in temperature from about 250° C. to 750° C.

Cooling ducts, illustratively denoted by 11, are mounted to the outside of the liner 6. The cooling ducts are connected in alternating sequence to one of two liner cooling equipment 12, 13. The arrows A and B indicate the direction of flow in the intakes 14, 15 of the liner cooling equipment 12, 13, while the letters C and D denote the direction of flow in the discharge conduits 16, 17 toward a pump not shown in further detail herein. Two branch-pipes 18, 19 and 20, 21 extend from the intakes 14, 15 to the cooling ducts 11. In each case another branch pipe 22, 23 passes upwardly into a heat insulating housing 24 and arrives at a cooling apparatus 25 therein. Then they return downwardly to the discharge conduits 16, 17 which also receive the exhaust pipes 26, 27 and 28, 29 resp. from the cooling ducts 11.

A safety valve 30, 31 starts at each of the discharge conduits 16 and 17, each valve being adjusted to a pressure somewhat above the operational pressure of the liner cooling equipment 12, 13. A motor-driven valve 32, 33 is provided in parallel and is remote-controlled and capable of totally pressure-relieving the discharge conduits 16, 17. The venting lines 34, 35, connected to the safety valves 30, 31,—that is to the motor-driven valves 32, 33—issue into a perforated manifold 36 within a water seal 37.

A safety valve 38 is mounted in the heat insulating housing 24 and is connected to a relief conduit 39 issuing from the inner chamber of the reactor pressure container. 5. A normally-open, motor-driven valve 40 also is located within this relief conduit 39.

Figure 2:
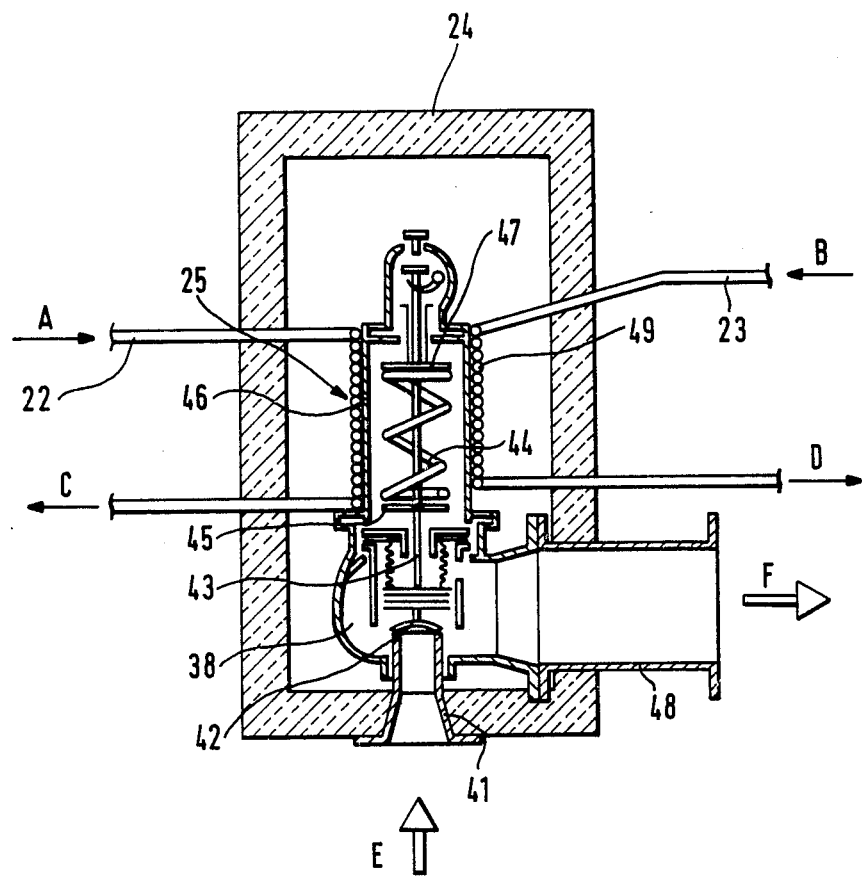
FIG. 2 is a vertical section of a safety valve of the high-temperature reactor of FIG. 1.

FIG. 2 schematically shows in greater detail the design of the safety valve 38. Its intake stub 41 is covered by a valve cone 42. This cone is connected by an actuation rod 43 having a helical spring 44, the lower end of the helical spring 44 resting on a pressure plate fixed to the actuation rod 43 and the upper end resting against a disk 47 connected to the spring case 46. The intake stub 41 is enclosed by the discharge stub 48 at right angle to it.

A cooling apparatus 25, in the form of welded-on cooling coils 49, is mounted on the outside of the spring case 46. The cooling coils 49 are supplied from both liner cooling equipment 12, 13 through the branch pipes 22, 23, the arrows A, B, C and D already shown in FIG. 1 indicating the particular directions of flow. The arrows E and F show the direction of flow when the safety valve 38 is open.

The above described system functions as follows when there is overheating of the nuclear reactor:

If, for instance the reactor gas cooling fails, the temperature within the reactor pressure container 5 rises and simultaneously therewith the pressure. Thereupon, the safety valve 38 triggers; that is, upon reaching a given design pressure, for instance 55 bars, the helical spring 44 no longer can keep the valve cone 42 out of the intake stub 41, whereby the valve cone 42 lifts off. The gas from the reactor pressure container 5 passing through the relief conduit 39 and flowing into the safety valve 38 is then vented through the discharge stub 48 into the reactor protecting building 2. The dimensions of the safety valve 38 are such that the excess pressure decays only in one to two hours.

The gas flowing in from the reactor pressure container 5 substantially raises the temperature of the lower part of the safety valve 38 because the gas itself is at a high temperature. However, heating of the helical spring 44 is essentially prevented by the cooling apparatus 25 as long as the liner cooling equipment 12, 13 operates properly, whereby the cooling apparatus 25 is provided through the branch pipes 22, 23 with cooling water. Accordingly, the helical spring 44 retains its design closing force, so that the safety valve 38 will at once close again the moment the pressure in the reactor pressure container has dropped to the normal operating pressure of 50 bars. In this malfunction, therefore, there is no pressure relief.

If one of the liner cooling equipment 12, 13 fails, then the other liner cooling equipment will maintain the cooling of the helical spring 44 adequately enough that this spring retains its closing force in such a malfunction. Only when both liner cooling equipment 12, 13 fail will the cooling apparatus 25 no longer be supplied and then fail itself. The gas flowing into the safety valve 38 then also heats the space enclosed by the spring case 46, and hence the spring 44 itself to such an extent that its closing force drops appreciably. Thereby any heat radiation through the heat insulating housing 24 will be prevented.

The remaining closing force of the spring valve 44 no longer is adequate to close the safety valve 38, even when the pressure drops back to normal operating pressure. This takes place only after a further drop in pressure matching the still present closing force of the helical spring 44. However, in that state the safety valve 38 still ensures there is overpressure, which even if below the operational pressure illustratively may be 16 bars.

If following failure of the liner cooling there takes place in the late stages of overheating of the nuclear reactor the melting of the liner 6, then a connection will be made between the reactor pressure container 5 and both liner cooling equipment 12, 13. If thereupon by evaporation of the concrete water there should be a new rise in pressure in the reactor pressure container, then this new pressure will be dropped by the safety valves 30, 31 which are set for the pressure level of the properly operating liner cooling equipment 12, 13, for instance at 16 bars. The gas mixture flowing away through the safety valves 30, 31 into the discharge conduits 34, 35 thereupon passes through the perforated manifold 36 into the water seal 37, where the steam condenses and where the solid and volatile fission products contained in the gas are washed out.

If full pressure relief of the reactor pressure container 5 is desired, the motor-driven valves 32, 33 are opened by remote control, whereby the gas still contained in the reactor pressure container 5 flows into the water seal 37 where it is washed out or condensed.

We claim:

1. A nuclear reactor, in particular a high-temperature reactor, with a reactor protecting building and therein a reactor pressure container in particular made of concrete, which is provided with at least one valve designed as a spring valve to limit the pressure in the reactor pressure container in the event of nuclear reactor overheating and which is provided with a liner on its inside and associated with cooling ducts communicating with at least one liner cooling equipment, characterized in that the valve spring (44) of a valve 38 consists of a material with a spring constant decreasing as the temperature rises and is subject to the heat of the gas flowing out when the valve 38 is open and that at least one cooling apparatus (25) is provided to cool at least one of the valve spring (44) and the gas before if flows out, said apparatus being connected to at least one liner cooling equipment (12, 13).

2. Nuclear reactor per claim 1, characterized in that the cooling apparatus (25) is connected to all liner cooling equipment (12, 13).

3. Nuclear reactor per claim 1, characterized in that the cooling apparatus (25) is connected to the particular intake (14, 15) of the particular liner cooling equipment (12, 13).

4. Nuclear reactor per claim 1, characterized in that the valve is designed in such a manner that any excess pressure in the reactor pressure container (5) leads to closing the valve (38) no sooner than after one hour.

5. Nuclear reactor per claim 1, characterized in that the material for the valve spring (44) evinces a spring-constant which drops markedly at temperatures above 150° C.

6. Nuclear reactor per claim 1, characterized in that the valve spring (44) of the valve is designed in such a manner that the closing force in the event of failure of either or both of the liner cooling equipment (12, 13) and open valve (38) will be in the range of the pressure level of either or both of the liner cooling equipment (12, 13).

7. Nuclear reactor per claim 1, characterized in that the valve (38) is designed in such a manner that the valve spring (44) is heated by the gas flowing out of the reactor pressure container (5) only after it is open.

8. Nuclear reactor per claim 1, characterized in that the valve (38) is enclosed by a thermally insulating housing (24).

9. Nuclear reactor per claim 1 characterized in that there is a plurality of valves and associated housings and each housing of one of the valves (38) is surrounded in the region of the valve spring (44) by welded-on cooling coils (49) of the cooling apparatus (25).

10. A high-temperature reactor with a reactor protecting housing and therein a reactor pressure container made of concrete and with an inside liner, associated with cooling ducts connected to at least one liner cooling equipment, as defined by claim 1,
characterized in that each liner cooling equipment (12, 13) is provided with at least one valve (30, 31) in the discharge conduit (16, 17).

11. A nuclear reactor per claim 10, characterized in that the valve (30, 31) evinces a closing force somewhat above the operational pressure of the particular liner cooling equipment (12, 13).

12. Nuclear reactor per claim 10, characterized in that there is a plurality of valves (30, 31) and each valve (30, 31) is provided with a venting conduit (34, 35) issuing into a water seal (37).

13. Nuclear reactor per claim 10, characterized in that there is a plurality of valves (30, 31) and each valve (30, 31) is bridged by a remote-controlled bypass valve (32, 33).

* * * * *